(12) United States Patent
Hofmann

(10) Patent No.: US 11,982,328 B2
(45) Date of Patent: May 14, 2024

(54) METHOD FOR PREVENTING STALLING OF AN INTERNAL COMBUSTION ENGINE OF A MOTOR VEHICLE

(71) Applicant: Volkswagen Aktiengesellschaft, Wolfsburg (DE)

(72) Inventor: Rainer Hofmann, Helmstedt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/195,805

(22) Filed: May 10, 2023

(65) Prior Publication Data
US 2023/0366439 A1 Nov. 16, 2023

(30) Foreign Application Priority Data
May 11, 2022 (DE) .................. 10 2022 204 633.1

(51) Int. Cl.
*F16D 48/10* (2006.01)
(52) U.S. Cl.
CPC .... *F16D 48/10* (2013.01); *F16D 2500/30404* (2013.01); *F16D 2500/30415* (2013.01); *F16D 2500/3067* (2013.01); *F16D 2500/3068* (2013.01); *F16D 2500/5048* (2013.01); *F16D 2500/7041* (2013.01); *F16D 2500/7082* (2013.01)

(58) Field of Classification Search
None
See application file for complete search history.

(56) References Cited

U.S. PATENT DOCUMENTS

| 2019/0136919 A1* | 5/2019 | Boland ............... F16D 48/06 |
| 2022/0118844 A1 | 4/2022 | Golder et al. |

FOREIGN PATENT DOCUMENTS

| DE | 4229024 A1 | 3/1994 |
| DE | 10304130 A1 | 8/2003 |
| DE | 102007043591 A1 | 3/2009 |
| DE | 102015001876 A1 | 8/2016 |
| DE | 102015202932 A1 | 8/2016 |
| DE | 112020000911 T5 | 11/2021 |
| EP | 1165981 B1 | 8/2004 |
| WO | WO2004028845 A1 | 4/2004 |

* cited by examiner

*Primary Examiner* — Timothy Hannon
(74) *Attorney, Agent, or Firm* — Muncy, Geissler, Olds & Lowe, P.C.

(57) ABSTRACT

A method for preventing stalling of an internal combustion engine of a motor vehicle, wherein the motor vehicle has at least one internal combustion engine, at least one automatically controlled clutch, and at least one transmission, wherein a drive shaft of the internal combustion engine can be coupled to a transmission input shaft of the transmission by means of the clutch to transmit torque, wherein the clutch is disengaged if a calculated rotational speed value of the drive shaft is less than a certain threshold value, and wherein the rotational speed value is calculated, in particular continually or continuously, as a function of a determined, current rotational speed of the drive shaft and as a function of a determined, current speed gradient of the drive shaft.

10 Claims, 1 Drawing Sheet

METHOD FOR PREVENTING STALLING OF AN INTERNAL COMBUSTION ENGINE OF A MOTOR VEHICLE

This nonprovisional application claims priority under 35 U.S.C. § 119(a) to German Patent Application No. 10 2022 204 633.1, which was filed in Germany on May 11, 2022, and which is herein incorporated by reference.

BACKGROUND OF THE INVENTION

Field of the Invention

The invention relates to a method for preventing stalling of an internal combustion engine of a motor vehicle.

Description of the Background Art

In principle, unintentional stalling of the internal combustion engine can occur during operation of the motor vehicle, in particular when the torque provided by the internal combustion engine is inadequate. In particular, this can occur, for example, at low rotational speeds of a drive shaft of the internal combustion engine and in the case of rapid load changes, such as, e.g., during startup or during a gear change. In addition, this can also occur, in particular, during engagement of a gear in an automatic transmission when the gear clutch or gearshift sleeve there is actively engaged. The combustion engine, in particular the internal combustion engine, can then be loaded with the drag torque of the converter and of the clutch, and stalling of the combustion engine, in particular of the internal combustion engine, can then take place even though the converter clutch is disengaged, for example.

Different methods are already known for preventing stalling of an internal combustion engine of a motor vehicle or for implementing stall protection of an internal combustion engine of a motor vehicle. The motor vehicle has at least one internal combustion engine, at least one automatically controlled clutch, and at least one transmission that, in particular, is also automatically controlled. The stalling of the internal combustion engine can then also be avoided under automatic control by means of such an automatically controlled clutch. The drive shaft of the internal combustion engine can be coupled to a transmission input shaft of the transmission by means of the clutch to transmit torque. The clutch is then disengaged if a calculated rotational speed value of the drive shaft is less than a certain threshold value. The rotational speed value is calculated, in particular continually or continuously, as a function of a determined, current rotational speed of the drive shaft and as a function of a determined, current speed gradient of the drive shaft.

DE 103 04 130 A1, the starting point for the invention, shows such a method—already described above—for preventing stalling of an internal combustion engine of a motor vehicle. The rotational speed value is determined as a function of the decrease in determined, current rotational speed over time, which is to say as a function of the speed gradient. As soon as the rotational speed value falls below the threshold value, the clutch is quickly disengaged, namely until the determined, current rotational speed of the drive shaft is again out of the critical range and there is no longer a risk of stalling when the clutch is engaged. When a possible stall of the internal combustion engine is detected, the threshold value can be changed in a situationally dependent manner. In general, however, it can happen that the clutch cannot be disengaged quickly enough on account of a system delay, for example of a clutch actuator, so that the internal combustion engine is nevertheless stalled. This is now avoided here in that the speed of disengaging the clutch is increased by appropriately driving the clutch actuator. However, limits are set on this speed increase, especially in the case of cold temperatures of the clutch and a hydraulically acting clutch actuator, so that a stall cannot be reliably avoided, especially in the case of cold temperatures, in particular outdoor temperatures, and a correspondingly cold, viscous hydraulic fluid.

In DE 10 2007 043 591 A1, a progressive disengagement of the clutch as a function of the speed gradient is proposed in order to prevent stalling. The problem already mentioned above can occur with this method, namely that the clutch cannot be disengaged quickly enough on account of a system delay of a clutch actuator, so that the internal combustion engine is nevertheless stalled.

DE 10 2015 202 932 A1 proposes a method in which an internal combustion engine is deliberately switched off when there is a risk of stalling in order to avoid damage to the components of the internal combustion engine, in particular on account of an operation of the internal combustion engine in a resonance range of a flywheel of the internal combustion engine. In this case, the internal combustion engine must then be restarted after a stall has been prevented, which takes a considerable amount of time and thus has an adverse effect on driving comfort.

SUMMARY OF THE INVENTION

It is therefore an object of the invention provide a method for preventing stalling of an internal combustion engine of a motor vehicle such that a risk of stalling of the internal combustion engine is reduced, and, in particular, such that the associated costs are low.

Av aspect of the invention resides, first of all, essentially in that a current temperature of the clutch is determined, in particular is measured. Another aspect of the invention is that a response time, in particular a response time to be expected, of the clutch as a function of the determined temperature of the clutch is then determined, in particular by means of a control and/or regulation device of the motor vehicle. Another aspect of the invention is that the rotational speed value to be calculated is then calculated from the sum of the determined, current rotational speed of the drive shaft and the product of the current speed gradient of the drive shaft and the aforementioned response time of the clutch.

In this way, a stalling of the internal combustion engine is reliably avoided, or a stall protection is implemented economically as a result.

By incorporating the response time of the clutch in the calculation of the rotational speed value, in particular of the rotational speed value that is then hypothetically applied after the response time has elapsed, it is ensured that the clutch is also disengaged in time.

Moreover, with such a calculation of the corresponding rotational speed value, the clutch also is not then disengaged too soon, which would disrupt the operation of the internal combustion engine and thus the driving comfort of the motor vehicle. It is assumed here that the rotational speed of the drive shaft decreases linearly with the slope characterized by the speed gradient, in particular after the transmission of a control signal to the clutch to actuate it and until the response time has elapsed, because the torque transmitted by means of the clutch cannot be immediately reduced on account of the system delay of the clutch. The rotational speed curves that actually occur will assume a slightly different shape, but the reality is reproduced sufficiently well by means of this linear model. Finally, the actuation of the clutch is intended to change a torque transmitted by the clutch from a current, initial value to a certain, specified final value. When the clutch is fully disengaged, the intent is, in particular, to achieve a final value of transmitted torque of essentially zero, in particular.

Now, the response time of the clutch also is essentially dependent on the temperature of the clutch, so the response time in question is determined especially accurately by the determination of the response time as a function of the current temperature. The dependence of the response time in question on the temperature in question is known in this case or, in particular, is determined and/or saved in advance for different temperatures and/or for certain temperature ranges.

The particular identified response time of the clutch as a function of the particular identified temperature can be read out from a characteristic map stored in the control and/or regulation device of the motor vehicle, in particular from a data table.

To create the characteristic map, the clutch or a clutch of identical construction is measured accordingly and the data obtained/determined for different temperatures are stored, in particular saved, in the control and/or regulation device of the motor vehicle. In this way, the respective response times for different temperatures can be determined with high accuracy in a simple manner.

The particular response time of the clutch can be calculated by means of a model stored in the control and/or regulation device of the motor vehicle. The model can also be based on measurement data of the clutch and/or of temperatures (outdoor temperature, temperature of clutch components, temperature of the hydraulic fluid, etc.), and/or the model is created with the aid of physical dependences of the clutch and associated mathematical equations and stored accordingly in the control and/or regulation device of the motor vehicle. In this way, the measurement effort can be at least reduced or even avoided entirely. Furthermore, such a model can be adapted easily and quickly to different clutches, so that development times can be shortened.

The clutch can be actuated by means of a hydraulic fluid in an advantageous example of the method. In particular, the temperature of the clutch is then measured and/or determined with the aid of the hydraulic fluid, in particular the temperature of the hydraulic fluid is then determined for the purpose of determining the temperature of the clutch.

In particular, the temperature can be measured by means of a temperature sensor arranged in the hydraulic fluid. Such a temperature sensor could also be arranged in a housing adjacent to a hydraulic passage carrying the hydraulic fluid. In a clutch of this design, the temperature of the hydraulic fluid, and in particular also its viscosity, is substantially responsible for the particular current response time of the clutch so that an especially exact determination or identification of the response time of the clutch, in particular the response time to be expected under these conditions, is possible with a measurement of the temperature in or near the hydraulic fluid.

The response time of the clutch advantageously has values between 1 s at −35° C. and 0.03 s at 90° C. In this way, the clutch can, in particular, be actuated quickly enough to achieve a high level of driving comfort. On the other hand, the design effort to achieve these response times also remains within reasonable limits, and therefore the method can be implemented very economically.

Preferably, a disengagement offset can be read out from a characteristic map stored in the control and/or regulation device of the motor vehicle or is calculated by means of a model stored in the control and/or regulation device of the motor vehicle. The certain threshold value is calculated, in particular, from the difference between a specified, certain target idle speed of the drive shaft and the disengagement offset. In particular, the disengagement offset is subtracted mathematically from the target idle speed. As a result, a simple calculation of the certain threshold value is possible with little computational effort. A prior determination of a threshold value is also possible, however.

The stall protection of the internal combustion engine thus implemented may not be deactivated again until after a specific time following a startup of the motor vehicle and/or following a gear change of the transmission.

There are certain operating states of the motor vehicle in which a risk of stalling is especially high, such as startup or a gear change in the transmission, in particular in a warm-up phase of the motor vehicle. In such a warm-up phase, the components and, in particular, the hydraulic fluids and/or lubricating fluids of the motor vehicle have not yet reached their operating temperature, so that, e.g., the transmission and/or the internal combustion engine and/or the clutch have greatly increased drag torques. After a certain time, in particular after such a warm-up phase, a stall protection that has been implemented can then be deactivated in some circumstances.

The clutch may not be engaged again after a disengagement of the clutch to implement the stall protection until the speed gradient assumes positive values. Thus, a rapid startup or continued driving can be achieved after stalling has been avoided, namely by means of a resumption of torque transmission from the internal combustion engine through the clutch to the transmission. In this case, the risk is low that the clutch must subsequently be disengaged again to prevent a stall.

Preferably, an engagement offset can be read out from a characteristic map stored in the control and/or regulation device of the motor vehicle or is calculated by means of a model stored in the control and/or regulation device of the motor vehicle. The clutch is not engaged again after a disengagement of the clutch until the determined, current rotational speed of the drive shaft is greater than the difference between the specified, certain target idle speed of the drive shaft and the engagement offset. In particular, the engagement offset is subtracted mathematically from the target idle speed in this case. Thus, the risk that the clutch subsequently must be disengaged again to prevent a stall after a resumption of torque transmission can be reduced further. The values are chosen here such that no strong jerking in the transmission occurs, and therefore the driving comfort is compromised as little as possible.

Advantageously, a value of the engagement offset can be less than a value of the disengagement offset. In this way, too, the risk that the clutch must be disengaged again to prevent a stall after a resumption of torque transmission can be reduced further. Jerking in the transmission can also be further reduced in this way.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
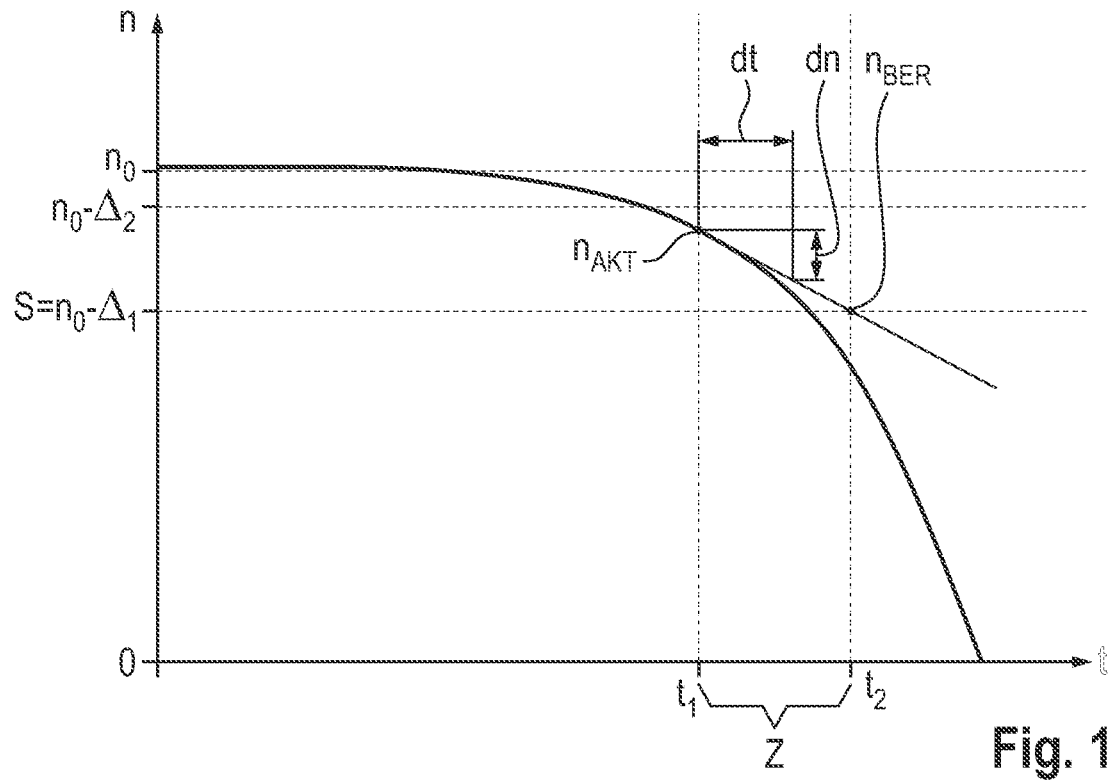
FIG. 1 is a graph of the rotational speed of the drive shaft as a function of time, in a schematic representation.

The method for preventing stalling of an internal combustion engine of a motor vehicle or the sequence of this method can be understood on the basis of the schematic representation of the graph of the rotational speed n of the drive shaft of the internal combustion engine as a function of the time t in FIG. 1.

The motor vehicle has at least one internal combustion engine, at least one automatically controlled clutch, and at least one transmission, in particular that is automatically controlled, in particular an automatic transmission. A drive shaft of the internal combustion engine can be coupled to a transmission input shaft of the transmission by means of the clutch to transmit torque. In particular, the clutch is designed as part of an automatic transmission, in particular as part of an automatic dual-clutch transmission.

The clutch is disengaged if a calculated rotational speed value $n_{CALC}$ of the drive shaft is less than a certain threshold value S. The calculated rotational speed value $n_{CALC}$, which does not correspond to the current speed of the drive shaft is calculated, in particular continually or continuously, as a function of a determined, current rotational speed $n_{AKT}$ of the drive shaft and as a function of a determined, current speed gradient dn/dt of the drive shaft.

"Continually or continuously" in this context can mean, in particular, that a calculated rotational speed value $n_{CALC}$ is present at all times, precisely so that a stalling can be avoided at all times.

Usually, the current rotational speed $n_{AKT}$ of the drive shaft is determined with the aid of speed sensors, which supply measurement signals at discrete angular positions of the drive shaft, and thus at discrete time intervals, wherein these discrete time intervals are so small, however, that a continuous signal can then be assumed here in the sense of reliable avoidance of stalling.

A current temperature T of the clutch is determined, in particular is measured. A certain response time Z of the clutch is likewise determined as a function of the determined temperature T of the clutch, in particular by means of a control and/or regulation device of the motor vehicle. The rotational speed value $n_{CALC}$ is calculated from the sum of the determined, current rotational speed $n_{AKT}$ of the drive shaft and the product of the current speed gradient dn/dt of the drive shaft and the response time Z of the clutch. This relationship can be represented as a formula as follows:

$$n_{CALC} = n_{AKT} + \frac{d_n}{d_t} \times Z$$

A risk of the internal combustion engine stalling is present when, in particular, the rotational speed n of the drive shaft decreases. When the rotational speed n of the drive shaft decreases, the speed gradient dn/dt has negative values, so that the calculated rotational speed value $n_{CALC}$ is then less than the determined, current rotational speed $n_{AKT}$ of the drive shaft. At the current, first time $t_1$, the response time Z is then in the future or extends into the future. It is assumed that the torque decreases linearly with the slope characterized by the speed gradient dn/dt after actuation of the clutch and until the response time Z has elapsed at a second time $t_2$ that likewise is in the future. Up until the time $t_1$, the curve of the rotational speed n represented in FIG. 1 corresponds to the values of the rotational speed determined up to that point. From the time $t_1$ onward, the curve of the rotational speed n is shown that would result if the motor vehicle were to continue to be operated under the same conditions as at the time $t_1$, in particular without stall avoidance and without the associated disengagement of the clutch, wherein the rotational speed n would then drop to the value zero, which would then mean precisely the stalling of the internal combustion engine.

Figure 2:
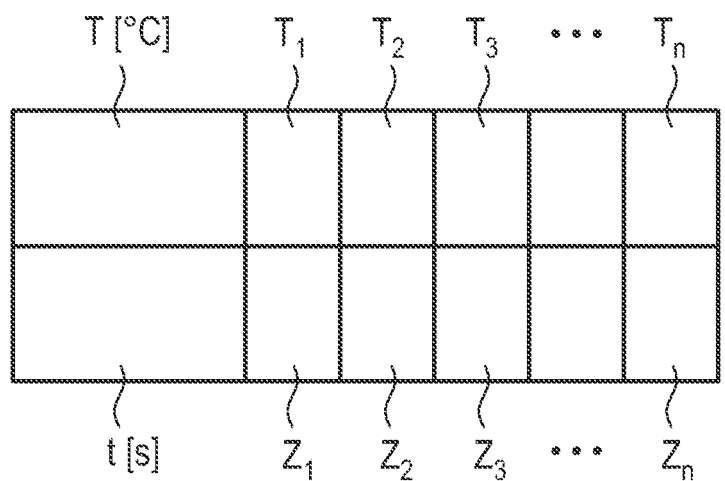
FIG. 2 is a dependence of the response time of the clutch on the temperature of the clutch, in tabular form.

The response time Z of the clutch is read out from a characteristic map stored in the control and/or regulation device of the motor vehicle, in particular from a table. Such a characteristic map, in particular the table, is represented in FIG. 2. The table here schematically shows different temperatures $T_1$ to $T_n$ and/or temperature ranges $T_1$ to $T_n$, wherein a particular response time $Z_1$ to $Z_n$ is associated with each temperature or each temperature range.

The current temperature T is then compared with the temperatures $T_1$ to $T_n$ or with the temperature ranges $T_1$ to $T_n$ by means of the control and/or regulation device, and the associated response time $Z_1$ to $Z_n$ is then determined in this way.

Alternatively, it is possible that the response time Z of the clutch is calculated by means of a model stored in the control and/or regulation device of the motor vehicle.

The clutch usually can be actuated by means of a hydraulic fluid. The current temperature T of the clutch is therefore measured and/or determined with the aid of the hydraulic fluid, in particular. However, the use of clutch actuators, which can be actuated electrically, for example, is also possible.

The response time Z of the clutch has values between 1 s at −35° C. and 0.03 s at 90° C.

A disengagement offset $\Delta_1$ is read out from a characteristic map stored in the control and/or regulation device of the motor vehicle or is calculated by means of a model stored in the control and/or regulation device of the motor vehicle. The disengagement offset $\Delta_1$ can be applied in this case. The certain threshold value S is then calculated, in particular from the difference between a specified, certain target idle speed $n_0$ of the drive shaft and the disengagement offset $\Delta_1$. In particular, the disengagement offset $\Delta_1$ is subtracted mathematically from the target idle speed no. This relationship can be represented as a formula as follows: $S = n_0 - \Delta_1$ Additional parameters that, in particular, have an effect on the stalling of the internal combustion engine can be taken into account by means of the disengagement offset $\Delta_1$.

The stall protection of the internal combustion engine can be deactivated, in particular only after a certain time following a startup of the motor vehicle and/or following a gear change of the transmission. Furthermore, the stall protection can also be activated during the entire operating period of the motor vehicle.

The clutch is not engaged again after implementation of the stall protection or after a disengagement of the clutch, in particular until the speed gradient dn/dt assumes positive values.

An engagement offset $\Delta_2$ is read out from a characteristic map stored in the control and/or regulation device of the motor vehicle or is calculated by means of a model stored in the control and/or regulation device of the motor vehicle. This engagement offset $\Delta_2$ can consequently also be applied. The clutch is not engaged again after a disengagement of the clutch until the determined, current rotational speed of the drive shaft $n_{AKT}$ is greater than the difference between the specified, certain target idle speed $n_0$ of the drive shaft and the engagement offset $\Delta_2$. In particular, the engagement offset $\Delta_2$ is subtracted mathematically from the target idle speed $n_0$ in this case.

A value of the engagement offset $\Delta_2$ is less than a value of the disengagement offset $\Delta_1$. This relationship can be represented as a formula as follows: $\Delta_2 < \Delta_1$ The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for preventing stalling of an internal combustion engine of a motor vehicle, the motor vehicle comprising at least one internal combustion engine, at least one automatically controlled clutch, and at least one transmission, wherein a drive shaft of the internal combustion engine is adapted to be coupled to a transmission input shaft of the transmission via the clutch to transmit torque, wherein the clutch is designed as part of an automatic transmission or part of an automatic dual-clutch transmission, the method comprising:

calculating a rotational speed value continually or continuously as a function of a determined, current rotational speed of the drive shaft and as a function of a determined, current speed gradient of the drive shaft;

determining a current temperature of the clutch;

determining a response time of the clutch as a function of the temperature of the clutch via a control and/or regulation device of the motor vehicle; and calculating the rotational speed value from a sum of the determined, current rotational speed of the drive shaft and the product of the current speed gradient of the drive shaft and the response time of the clutch; and disengaging the clutch if the calculated rotational speed value of the drive shaft is less than a certain threshold value.

2. The method according to claim 1, wherein the response time of the clutch is read out from a characteristic map stored in the control and/or regulation device of the motor vehicle, in particular from a saved data table.

3. The method according to claim 1, wherein the response time of the clutch is calculated by a model stored in the control and/or regulation device of the motor vehicle.

4. The method according to claim 1, wherein the clutch is actuated by a hydraulic fluid, and wherein the temperature of the clutch is measured and/or determined with the aid of the hydraulic fluid.

5. The method according to claim 1, wherein the response time of the clutch has values between 1 s at −35° C. and 0.03 s at 90° C.

6. The method according to claim 1, wherein a disengagement offset is read out from a characteristic map stored in the control and/or regulation device of the motor vehicle or is calculated by a model stored in the control and/or regulation device of the motor vehicle, wherein the threshold value is calculated from the difference between a specified, certain target idle speed of the drive shaft and the disengagement offset, or wherein the disengagement offset is subtracted mathematically from the target idle speed.

7. The method according to claim 1, wherein the correspondingly implemented stall protection of the internal combustion engine is not deactivated again until after a specific time following a startup of the motor vehicle and/or following a gear change of the transmission.

8. The method according to claim 1, wherein the clutch is not engaged again after a disengagement of the clutch until the speed gradient assumes positive values.

9. The method according to claim 8, wherein an engagement offset is read out from a characteristic map stored in the control and/or regulation device of the motor vehicle or is calculated by means of a model stored in the control and/or regulation device of the motor vehicle, wherein the clutch is not engaged again after a disengagement of the clutch until the determined, current rotational speed of the drive shaft is greater than the difference between the specified, certain target idle speed of the drive shaft and the engagement offset, or wherein the engagement offset is subtracted mathematically from the target idle speed in this case.

10. The method according to claim 9, wherein a value of the engagement offset is less than a value of the disengagement offset.

* * * * *